UNITED STATES PATENT OFFICE.

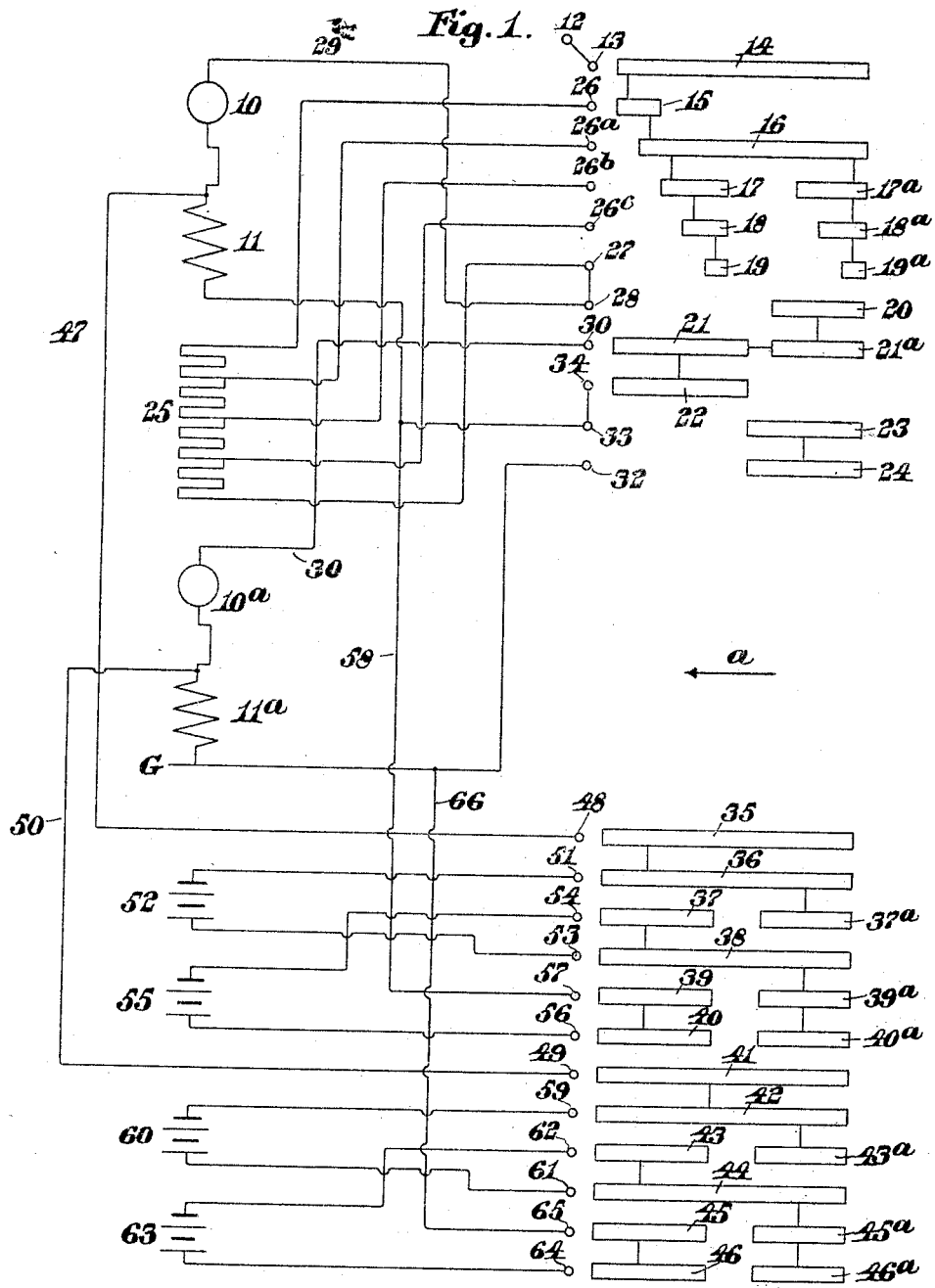

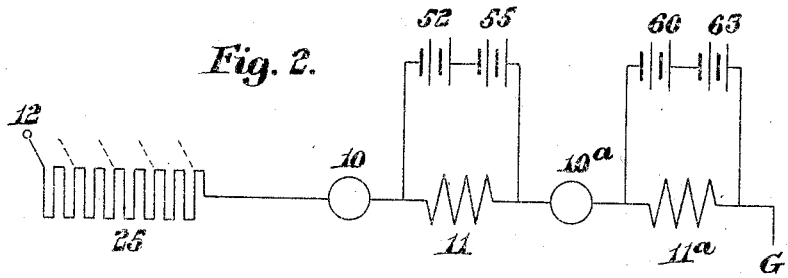
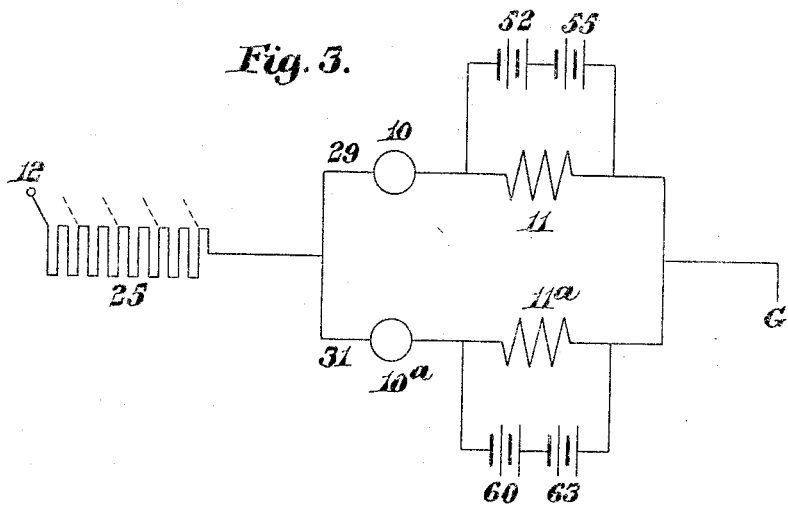
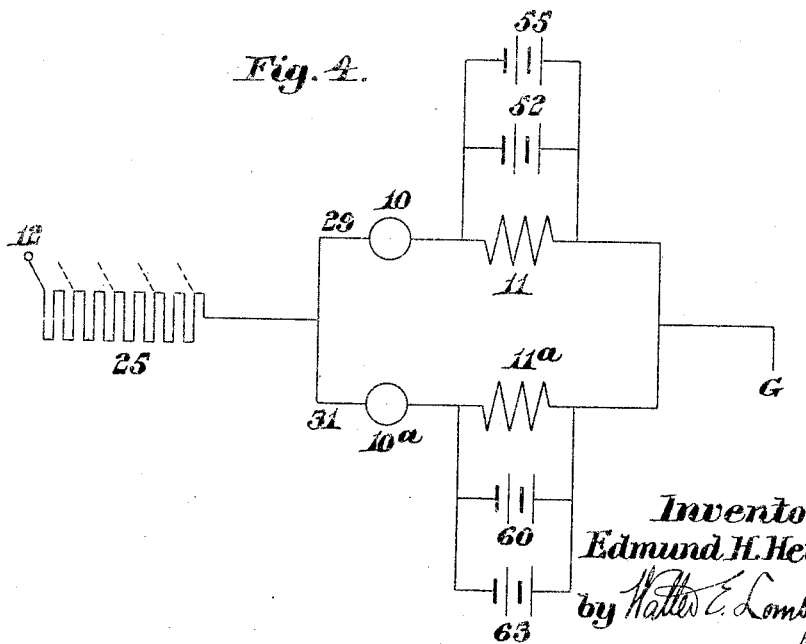

EDMUND H. HEWINS, OF SHARON, MASSACHUSETTS.

ELECTRICALLY-PROPELLED VEHICLE.

1,279,867.    Specification of Letters Patent.    Patented Sept. 24, 1918.

Application filed February 8, 1917. Serial No. 147,934.

*To all whom it may concern:*

Be it known that I, EDMUND H. HEWINS, a citizen of the United States of America, and a resident of Sharon, in the county of Norfolk and Commonwealth of Massachusetts, have invented certain new and useful Improvements in Electrically-Propelled Vehicles, of which the following is a specification.

This invention relates to electrically propelled vehicles and particularly to that class of vehicles which obtain their current from a stationary source of power through a trolley, and it has for its object the production of means for controlling the power whereby during certain operations of the vehicle some of the power may be stored and subsequently used when any additional power is required.

The invention consists of two motors normally in series but adapted to be connected in parallel, the field of each of said motors being energized by a pair of supplemental batteries, each pair of said batteries being adapted to be subdivided or connected in parallel to each other when it is desired to weaken the fields.

The invention further consists in certain novel features of construction and arrangement of parts which will be fully understood by reference to the description of the drawings and to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings:

Figure 1 represents a diagram illustrating the principles of the present invention, and showing how the various changes desired may be made by means of the controller.

Fig. 2 represents a diagram showing the resistance and the two motors in series as is common with trolley cars and the motors electrically connected to supplemental batteries by which the fields of the motors may be energized.

Fig. 3 represents a diagram showing the resistance connected to the motors in parallel and with the fields of the motors connected in parallel to the supplemental batteries, and Fig. 4 represents a diagram showing the resistance connected to the motors in parallel and with the field batteries subdivided for the purpose of weakening the fields of the motors.

Similar characters designate like parts throughout the several figures of the drawings.

In the drawings, 10 and $10^a$ are two motors and 11 and $11^a$ the field coils thereof, all as now in general use on trolley cars.

As all the instrumentalities used in this apparatus may be of any well-known construction, it is deemed unnecessary to show them in detail, and hence throughout the drawings the various devices used will be illustrated by symbols.

The trolley is indicated by the symbol 12 electrically connected to the contact point 13 in the same plane with the contact plate 14 of the usual controller. This controller is also provided with the usual contact plates 15, 16, 17, $17^a$, 18, $18^a$, 19, $19^a$, 20, 21, $21^a$, 22, 23, and 24. The plates 14, 15, 16, 17, 18, and 19 are connected and in a similar manner the plates 16, $17^a$, $18^a$, and $19^a$ are connected together.

The plate 20 is connected to a plate $21^a$ and this latter plate is connected to plate 21, which in turn is connected to plate 22. The plates 23 and 24 are also electrically connected.

The resistance 25 is shown as having four sections, each connected to a contact point 26, $26^a$, $26^b$, and $26^c$, while the opposite end of said resistance is connected to the contact point 27.

In the rotation of the controller in the direction of the arrow shown at $a$ the contact plates are adapted to connect with the resistance contact points, as follows: plate 15 with point 26, 16 with $26^a$, 17 and $17^a$ with $26^b$, 18 and $18^a$ with $26^c$, 19 and $19^a$ with 27. The contact point 27 is also connected with contact point 28 connected by wire 29 to the motor 10 and its field coil 11.

The contact plates 21 and 21ª are adapted in the rotation of the controller to connect with the contact point 30 which is connected by the wire 31 with the motor 10ª and its field coil 11ª, one end of which is connected to the ground G and is also connected to the contact point 32 adapted in the rotation of the controller to connect with the contact plate 24 thereof. As previously stated, the plate 24 is connected to the plate 23 which is adapted to connect with the contact point 33 in the rotation of the controller. This contact point 33 is connected to one end of the field 11 and is also connected to the contact point 34 adapted to be connected with the contact plate 22 during the rotation of the controller.

In the first movement of the controller the following connections are made,—trolley 12 and its contact point 13 with plate 14, to plate 15, to resistance contact point 26, through resistance 25 to contact point 27, to contact point 28 to motor 10 and its field 11 and from the latter through contact point 33 to point 34, through plates 22 and 21 to contact point 30, to motor 10ª, and its field 11ª, to ground G.

The next four successive movements of the controller will retain the same connections except that one section of the resistance 25 will be cut out with each movement. During all these movements of the controller the motors 10 and 10ª are connected in series.

When the controller has been rotated until the plates 14, 16, 20, 21ª, 23 and 24 are connected with the contact points 13, 26ª, 28, 30, 33, and 32 the current will pass from the trolley through plates 14, 15 and 16 to contact point 26ª to the resistance 25 and then to contact points 27 and 28. From point 28 the current passes through wire 29 to motor 10 and field coil 11 from which it passes to contact point 33 and then to the plate 23 from which it passes through plate 24 and contact point 32 to the ground G.

The current will also pass from point 28 to plate 20, then through plate 21ª to point 30 from which it will pass through wire 31 to motor 10ª and field coil 11ª to ground G.

When thus connected the motors 10 and 10ª are in parallel and only three of the sections of resistance 25 are in circuit.

The next two movements of the controller will successively throw out two more sections of the resistance 25, the circuit otherwise remaining unchanged.

At the last movement of the controller the plates 20 and 21ª will connect through the points 28—30 with the motors 10 and 10ª and field coils 11 and 11ª and the latter will be connected through contacts 33—32 with plates 23 and 24 to the ground G. This connection will be as shown by Fig. 4 except that resistance 25 is cut out and the batteries 52, 55, 60 and 65 are not connected.

The wiring thus far described is substantially that used on trolley cars now in general use.

In the present invention the controller is provided with the additional contact plates 35, 36, 37, 37ª, 38, 39, 39ª, 40, 40ª, 41, 42, 43, 43ª, 44, 45, 45ª, 46 and 46ª.

A wire 47 leads from the field 11 to a contact point 48 adapted to connect with plate 35 when the controller is rotated in the direction of the arrow $a$ and at the same time the plate 41 connects with the contact point 49 from which a wire 50 leads to the field 11ª.

The plate 35 is connected to plate 36 and the latter with plate 37ª, while the plate 37 is connected to plate 38 and the latter with 39ª, and through the latter to the plate 40ª. Plates 39 and 40 are also connected together.

The group of contact plates 41 to 46ª inclusive are connected together in the same manner i. e., 41, 42, and 43ª are connected together, also 43, 44, 45ª and 46ª, while the plate 45 is connected to plate 46.

The contact plate 36 is adapted to connect with the contact point 51 connected to one end of a storage battery 52 of any desired number of cells the opposite end of said battery 52 being connected to the contact point 53 adapted to be connected with plate 38 during the rotation of the controller.

The plate 37 is adapted to be connected with the contact point 54 connected to one end of the battery 55, the opposite end of which is connected to the contact point 56 adapted to be connected with the plate 40 when the controller is rotated.

The plate 39 is adapted to be connected with the contact 57 from which a wire 58 leads to the field coil 11. The plate 42 is adapted to be connected with the contact point 59 connected to the battery 60 the opposite end of which is connected to the contact point 61 adapted to be connected with the plate 44.

The plate 43 is adapted to be connected to contact point 62 connected to battery 63, the opposite end of which is connected to the contact point 64 adapted to be connected with the plate 46 during the rotation of the controller.

The plate 45 is adapted to be connected with the contact point 65 from which a wire 66 leads to the ground G.

During the first parts of the rotation of the controller the plates 35, 36, 37, 38, 39, 40, 41, 42, 43, 44, 45, and 46 engage with the contact points 48, 51, 54, 53, 57, 56, 49, 59, 62, 61, 65, and 64 respectively, and while in contact therewith the batteries 52, 55, 60, and 63 are electrically connected with the field coils 11 and 11ª.

The electrical connections under these conditions are as follows: The wire 47 from the field coil 11 leads to contact point 48 in engagement with the plate 35, and a portion of the current passes to plate 36 through contact point 51 to battery 52 and then to contact point 53 through plates 38 and 37 to contact point 54 and then through battery 55 from which it passes to contact point 56 and then through plates 40 and 39 to contact point 57 from which the wire leads back to said field coil 11.

In like manner a wire 50 leads from the coil 11$^a$ to contact point 49 which is in electrical contact with plate 41 through which a portion of the current passes to plate 42 and through it to contact point 59 and thence through battery 60 to contact point 61 and plate 44 and then through plate 43 to contact point 62 and the battery 63 from which the current passes to contact point 64, through plates 46 and 45 to contact point 65 from which the wire 66 leads back to the field coil 11$^a$ and the ground G.

It is self-evident that when thus connected the supplemental batteries 52—55 are in parallel with field coil 11 and the batteries 60—63 are in parallel with the field coil 11$^a$.

When the controller has been rotated so that the contact points 54, 57, 56, 62, 65 and 64 are engaged by the plates 37$^a$, 39$^a$, 40$^a$, 43$^a$, 45$^a$, and 46$^a$, the batteries 52 and 55 are brought into parallel with each other and with the field coil 11 and the batteries 60, 63 are brought into parallel with each other and with the field coil 11$^a$.

At this time the electrical connections are as follows:

The wire 47 leading from field coil 11 to contact point 48 in contact with plate 35 causes a portion of the current to pass through plate 36 and contact point 51 to battery 52 and from said battery 52 through contact point 53 to plate 38 from which the current passes to plate 39$^a$ and then through contact point 57 and wire 58 to field coil 11. A portion of the current also passes from plate 36 through plate 37$^a$ and contact point 54 to battery 55 and from this battery 55 through contact point 56, plates 40$^a$, 39$^a$ and contact 57 to the wire 58 leading to the field coil 11.

The wire 50 leading from field coil 11$^a$ to contact point 49 in contact with plate 41 permits a portion of the current to pass through plate 42 and contact point 59 to battery 60 and thence through contact point 61, plates 44, 45$^a$ and contact point 65 to wire 66 leading to field coil 11$^a$.

A portion of the current also passes from the plate 42 through plate 43$^a$ and contact point 62 to battery 63 and thence through contact point 64, plates 46$^a$, 45$^a$ and contact point 65 to wire 66 leading to field coil 11$^a$.

It will be observed by an inspection of Fig. 1 that the plates 37$^a$, 39$^a$, 40$^a$, 43$^a$, 45$^a$, and 46$^a$ are disposed on the controller immediately beneath and in the same vertical plane with the plates 14$^a$, 16$^a$, 17$^a$, 18$^a$, 19$^a$, 20, 21$^a$, 23 and 24, while the plates 37, 39, 40, 43, 45 and 46 are beneath and in the same vertical plane with the plates 15, 17, 18, 19, 21 and 22.

As a consequence when the motors 10 and 10$^a$ and field coils 11 and 11$^a$ are in series the said batteries 52, 55 are in series with each other and in parallel with the field coil 11 while the batteries 60, 63 are in series with each other and in parallel with the field coil 11$^a$, all as shown in Fig. 2.

The object of the plates 37$^a$, 39$^a$, 40$^a$, 43$^a$, 45$^a$, and 46$^a$, is to provide means whereby the pairs of batteries 52 55, and 60 63 may be changed from their series relation with each other to a parallel relation with each other while electrically connected to their respective motor-field coils when said motors and field-coils have been placed in parallel by the rotation of the controller, all as shown in Fig. 4.

By mounting the plates 14 to 24 inclusive on a tubular controller and having the plates 34 to 46$^a$ inclusive upon an auxiliary member rotatable independently of said tubular member, it is self-evident that by the rotation of said auxiliary member the two pairs of batteries 52 55, and 60 63, may be placed in parallel with their respective motor fields either when said motors 10, 10$^a$ are in series as in Fig. 2 or in parallel as in Fig. 3, and it is also self-evident that by the rotation of the main controller to place the motors in parallel while the auxiliary controller remains at its off position the motors 10, 10$^a$ may be used without the supplemental batteries. Or these batteries may be electrically connected with the field coils 11, 11$^a$ by rotating the auxiliary controller until the plates 35, 36, 37, 38, 39, 40, 41, 42, 43, 44, 45, 46 are in contact with their respective contact points.

By means of this system the motors 10, 10$^a$ may be used under the following conditions:

1st. In series without supplemental batteries as in trolley cars now in general use.

2nd. In parallel without supplemental batteries as in trolley cars now in general use.

3rd. In series with supplemental batteries electrically connected with the field coils thereof.

4th. In series with supplemental batteries in parallel with each other and electrically connected with the field coils thereof.

5th. In parallel with supplemental batteries electrically connected with the field coils thereof.

6th. In parallel with supplemental batteries in parallel with each other and electrically connected with the field coils thereof.

The electrical energy received through the trolley from the main generator is at substantially constant voltage, and it has been found desirable at times to supplement the work of the motors by means of storage batteries electrically connected to the field coils of said motors, and it has also been found that a variable E. M. F. of these batteries is very advantageous.

For instance, when starting a car or sometimes when running slowly it is an advantage to have a strong field and this is obtained by having the storage batteries of each motor in series with each other and electrically connected with the field coils of their respective motors 10, 10ª.

When slowing the car preparatory to stopping, the storage batteries may be thrown into action, thereby strengthening the field coils and making the braking action more effective, a less amount of resistance in series with the motors being required during this operation.

When running at a high speed, however, it is desired to have a weaker field, which is accomplished by changing the pairs of batteries 52—55 and batteries 60—63 from series with each other to parallel with each other, as previously described.

The diagrams, Figs. 2, 3, and 4, show three of the changes that may be obtained by this improved system. For instance, Fig. 2 shows the resistance 25 and motors 10, 10ª in series, as is common with trolley cars, with the several sections of the resistance to be cut out by the successive steps of the main controller and the field coils of the motors adapted to be energized by the supplemental storage batteries when the auxiliary controller is operated.

Fig. 3 shows the motors in parallel with the field coils adapted to be connected with their respective batteries by the operation of the auxiliary controller.

As the speed increases, the field batteries are divided as shown in Fig. 4, which operation weakens the field and permits a further increase in speed.

It is obvious that any number of cells may be used in the storage batteries and any number of sections of resistance may be successively cut out in starting or accelerating the speed of the car or cut in when reducing the speed.

When stopping a car or going down grade the motors may be connected with the supplemental batteries 52, 55, 60 and 63, which batteries serve to energize the field coils 11, 11ª and cause the motors to act as generators, thereby producing a braking action adapted to effectually stop the car on a level road or to restrain its speed while going down hill while the energy of the motors ordinarily required to effect these objects is returned to the trolley line to assist other cars or to relieve the power station. With this system in use the mechanical brake is seldom required and when used is generally for the purpose of holding a car when stopped on a grade and then only when the car has come nearly to a full stop.

As a consequence of the absence of use of the mechanical brake, flat spots on the wheels are prevented.

Moreover, with this improved system the car may be stopped more quickly than by the use of mechanical brakes inasmuch as the braking action is brought into play by each step of the controller toward the zero position and not by a subsequent operation.

Another advantage of the invention is that by its use the "skidding" of the wheels is absolutely prevented, thus effecting a quicker stopping of the car and avoiding flat spots on the wheel from that cause.

It is believed that the operation and many advantages of this invention will be fully understood from the foregoing description.

Having thus described my invention, I claim:

1. The combination of a source of electrical energy; a motor in circuit therewith; two supplemental batteries electrically connected to the field coil of said motor; and means whereby said motor may be used independently of said batteries or with said batteries in parallel therewith and with each other.

2. The combination of a source of electrical energy; a motor in circuit therewith; a supplemental battery electrically connected to the field coil of said motor; and means whereby said motor may be used either independently of said battery, electrically connected therewith, or with said battery in parallel with the field of said motor.

3. The combination of a source of electrical energy; two motors normally in series therewith; two supplemental batteries for each motor; and a controller adapted to connect the fields of said motors in parallel and the batteries of each motor in parallel therewith and with each other.

4. The combination of a source of electrical energy; two motors normally in series therewith; two supplemental batteries for each motor; a main controller adapted to connect said motors in parallel; and a secondary controller adapted to connect said batteries in parallel with each other and with the fields of their respective motors when the latter are in series or in parallel.

5. The combination of a trolley; two motors in series therewith; two supplemental batteries for each motor; means for electrically connecting one pair of said batteries with the field of each motor; and means whereby the circuit of each pair of said batteries may be changed to cause them to be in parallel with the field of their motor and in parallel with each other.

6. The combination of a trolley; a motor in circuit therewith; two supplemental batteries electrically connected to the field coil of said motor; and means whereby said motor may be used independently of said batteries or with said batteries in parallel with the field thereof and with each other.

7. The combination of a trolley; a motor in circuit therewith; a supplemental battery electrically connected to the field coil of said motor; and means whereby said motor may be used either independently of said battery, electrically connected therewith, or with said battery in parallel with the field of said motor.

8. The combination of a trolley; two motors normally in series therewith; two supplemental batteries for each motor; and a controller adapted to connect said motors in parallel and the batteries of each motor in parallel with its field and with each other.

9. The combination of a trolley; two motors normally in series therewith; two supplemental batteries for each motor; a main controller adapted to connect said motors in parallel; and a secondary controller adapted to connect said batteries in parallel with each other and with the fields of their respective motors when the latter are in series or in parallel.

Signed by me at 4 Post Office Sq., Boston, Mass., this 5th day of February, 1917.

EDMUND H. HEWINS.

Witnesses:
WALTER E. LOMBARD,
NATHAN C. LOMBARD.

Copies of this patent may be obtained for five cents each, by addressing the "Commissioner of Patents, Washington, D. C."